(12) United States Patent
Hennings et al.

(10) Patent No.: US 7,484,179 B2
(45) Date of Patent: Jan. 27, 2009

(54) INTEGRATED WORK MANAGEMENT AND TRACKING

(75) Inventors: Eric J. Hennings, Seattle, WA (US); Michael D. Pinckney, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 409 days.

(21) Appl. No.: 11/172,272

(22) Filed: Jun. 30, 2005

(65) Prior Publication Data

US 2007/0006085 A1 Jan. 4, 2007

(51) Int. Cl.
*G06F 3/048* (2006.01)
(52) U.S. Cl. .................. 715/764; 715/765; 715/766
(58) Field of Classification Search .................. None
See application file for complete search history.

(56) References Cited

U.S. PATENT DOCUMENTS 5,809,247 A * 9/1998 Richardson et al. ......... 709/218
5,999,911 A * 12/1999 Berg et al. ...................... 705/9
6,262,730 B1 * 7/2001 Horvitz et al. .............. 715/707
6,572,662 B2 * 6/2003 Manohar et al. ............ 715/526

* cited by examiner

*Primary Examiner*—Doug Hutton
*Assistant Examiner*—Soumya Dasgupta (57) ABSTRACT

The present application describes a work management/tracking framework that allows users to organize work around goals that may utilize several applications. Goals may encompass smaller individual tasks that span more than one application. An action object is used to represent a goal and can have one or more task items associated with it. The task items associated with an action object represent tasks that are included in the events and processes necessary to accomplish the goal. As a user works, the tasks that the user works on are tracked. If the user has requested to maintain the tasks in an action object, the tasks are associated with an action object. The user is assisted in pulling in possible task items that the user may wish to associate with an action object by being provided with a list of selectable task items that may be related to the action object.

15 Claims, 7 Drawing Sheets

FIG. 7

INTEGRATED WORK MANAGEMENT AND TRACKING

BACKGROUND

The number of jobs that require management of a large amount of information have increased significantly over the last few years. In addition, such jobs have seen an exponential rise in the amount and types of information that is required to be managed. Managing such information is more difficult, not only because of the increase in volume but because of the complex, ambiguous and changing nature of information.

Rapid growth in information sources and communication drive volume; new business models/techniques drive complexity; virtual teaming, matrix management and partnership relationships increase ambiguity. Information technologies that were non-existent a mere ten or fifteen years ago are common in a typical workplace today (e.g. email, Internet, instant messaging, etc.).

As the volume and complexity of information has increased, so has the difficulty of managing information. Information workers are finding it harder and harder to efficiently manage the information they use in performing routine tasks to accomplish larger goals.

Typically, users utilize several applications to perform tasks associated with a work goal. For example, a worker who is responsible for creating and presenting a financial presentation must not only utilize an electronic slide presentation application, but he may also need to access email messages, word processing documents, electronic spreadsheets, etc. in the course of preparing the presentation. It can become burdensome for the worker to open several applications and search for relevant files that the worker needs to perform the goal of creating the financial presentation.

SUMMARY

The present disclosure describes an integrated work management and tracking framework that allows users to organize work around goals that may utilize several applications. Goals (e.g. organize meeting) may encompass smaller individual tasks (send email, print flyer, reserve conference room, etc.) that span more than one application (e.g. email, word processor, reservation system, etc.).

An action object is used to represent a goal (or, as used herein, an "action") and an action object can have one or more task items associated with it. The action object represents a goal and the task items associated with an action object represent tasks that are included in the events and processes necessary to accomplish the goal.

As a user works, the tasks that the user works on are tracked. If the user has requested to maintain the tasks in an action object, the tasks are associated with an action object. In one particular implementation, the tasks are tracked before the user decides to save them in an action object. This way, the user can work on some tasks and thereafter decide that the tasks should be stored as an action.

When a user stops work, the action object is stored so that it can be retrieved. Links to everything (e.g. emails, documents, spreadsheets, etc.) that the user works on in association with the action object are stored along with states and processes. When the action object is re-opened, the user is presented with a view that provides links to every task that the user may need to work on the action.

The user is assisted in pulling in possible task items that the user may wish to associate with an action object by being provided with a list of selectable task items that may be related to the action object. One way in which this may be accomplished is by presenting collateral task items that are similar to the task items that have been associated with the action object. Another way is by presenting default task items from a template of an action object type that is of the same type as the action object. Or, collateral task items from actions objects having a same type as the action object presently active can be presented to the user for possible inclusion into the presently active action object.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Overview

The presently described subject matter provides a work management framework for information workers focus on goals they need to accomplish even if the goals entail tasks to be performed across a range of tools and/or applications. Typically, an information worker has a large number of task lists spread across multiple locations and multiple applications but no mechanism to bring them all together. This makes organizing multiple work processes to accomplish goals somewhat inefficient. The presently described work management framework is a goal-centered computing configuration that assists information workers in keeping track of multiple tasks associated with a work goal and in organizing the tasks necessary to complete the goal.

A primary building block of the work management framework described herein is an action, or an action object. An action is application independent and represents a work goal and may be thought of as a collection of files, states, processes, links, workspace, and the like, that are related to accomplishing the goal. An action object is an object that can be stored on one or more computer-readable media to retain the attributed related to an action. However, the terms "action" and "action object" can be used interchangeably depending on the context in which the term is used.

An action has several characteristics but it is basically a unit of work as defined by a user. For example, "Borrow book from Jim" is an action; "Build a new factory" is an action. An action, as viewed within the presently described framework, contains information that the user requires to accomplish the work, such as documents, messages, files, contacts, relationships, processes, database records, images, etc. An action may also include a sub-action which has its own unique attributes.

Action objects are stored in a flexible configuration that allows them to have arbitrary tools, processes and/or documents/reference materials associated with them (i.e. "task items"). When an action object is associated with a task item, an extension/linking approach is used so that the task items remain embedded in their original applications and do not require multiple copies of documents, messages, etc. This also allows multiple users and/or action objects to link to the same task items.

Action objects may also be marked with attributes that allow them to be sorted, filtered, prioritized and otherwise visualized and categorized. Actions also create a workspace for the user to work in which provides context for other tools and stores state information about what the user is currently doing to work on the action.

A user may create an action object in any of several ways. In at least one implementation, a user may decide that work already underway should be saved as an action object. In one or more other implementations, a user has a goal in mind and creates an action object before starting work on the goal. The user can create the action object from a template or from scratch.

Tasks that are a part of a goal (or action) are tracked as the user works. In the following discussion, tasks associated with an action object are referred to as "task items." However, the terms "task" and "task item" are interchangeable. The task tracking feature is configurable to track a task history for different amounts of time or not at all.

To assist the user in gathering necessary tools that may be necessary to accomplish an action, one or more implementations include collateral task items that are identified and presented to the user in a selectable format. Collateral task items are task items not currently associated with an action object, i.e. the user hasn't accessed the task items in a current tracking session and hasn't manually associated the task items with the action object.

One manner in which collateral task items may be identified is by identifying collateral items to be an task items associated with at least one other action object that are similar to task items associated with a current action object. For instance, it a task item associated with the current action object is an email to "mikep", then other emails to "mikep" can be presented to the user. The user may select any collateral task item or none at all, depending on if they relate to the current action item. The collateral task items are then included as task items with the current action object.

Another way in which collateral task items may be identified is to identify a type associated with a current action object. Any action object may have a type associated with it. Action objects of the same type correspond in some manner, such as by having a similar associated goal. For example, an action object may have a type of "patent application". Collateral task items for an action object of type "patent application" will be task items associated with other actions object of type "patent application."

Action objects also serve to preserve and re-create a user workspace. When an action is saved, all the task items as well as the user interface state are saved with the corresponding action object. When the action is re-opened, the user interface and task items are restored to a state in which they were when the user saved them. This places all the tools the user may require at his disposal when opening an action.

Further details of the work management system and methods associated therewith are described in greater detail below, with respect to FIGS. 1 through 7.

Exemplary User Interface

Figure 1:
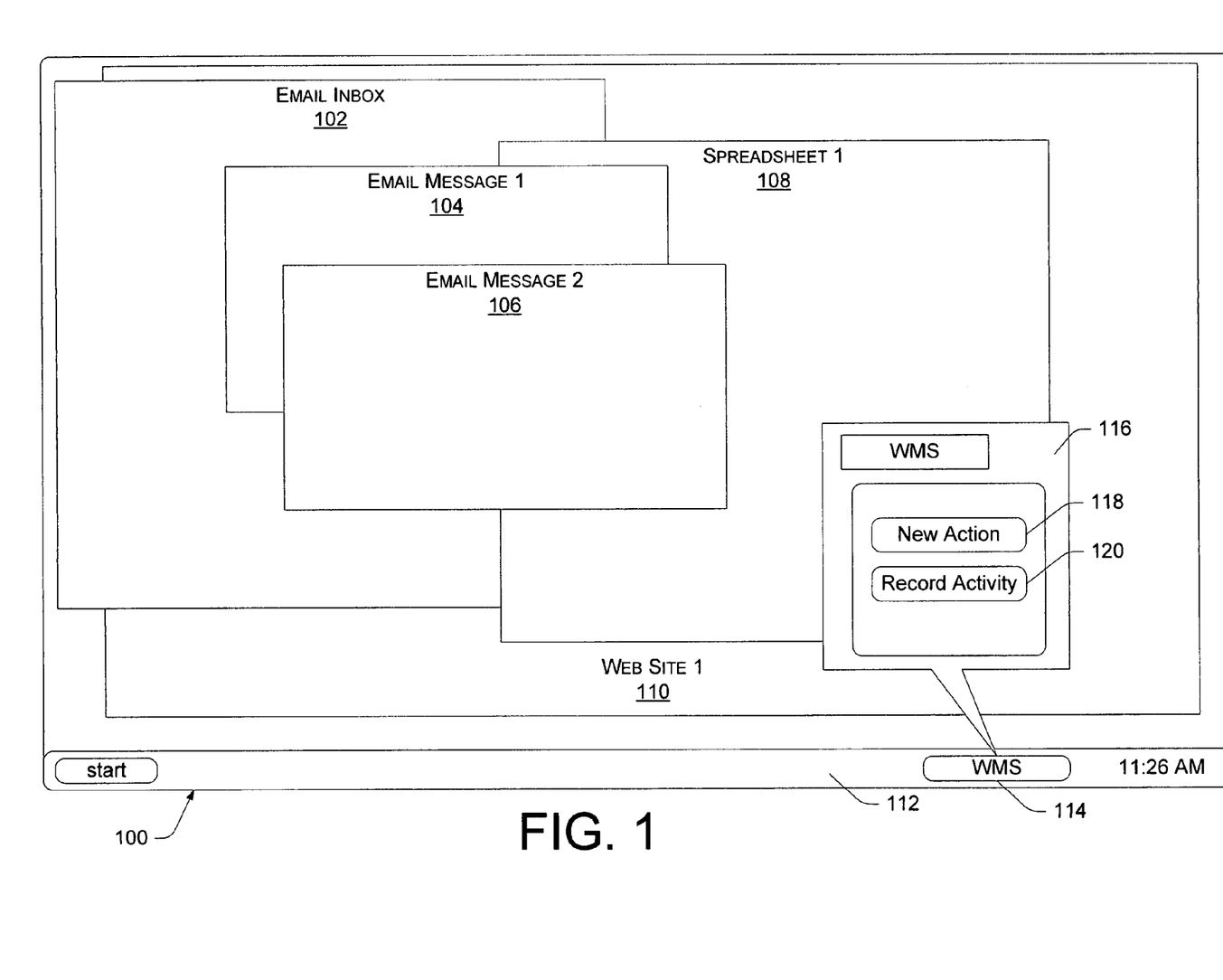
FIG. 1 is a simplified illustration of a user interface having a work management framework in accordance with the present invention included therein.

FIG. 1 is a simplified illustration of an exemplary user interface 100 in accordance with the present description. The exemplary user interface 100 is shown in a state that might result from a user's working experience since, typically, users will have multiple tiles open for one or more applications.

The exemplary user interface 100 includes tiles for an email inbox 102, a first email message ("email message 1" 104) and a second email message ("email message 2" 106). The exemplary user interface 100 also includes tiles for a spreadsheet ("spreadsheet 1" 108) and a web site ("web site 1" 110).

A tool bar 112 is included in the exemplary user interface 100 and includes a work management system ("WMS") button 114. When the WMS button 114 is actuated as shown, a WMS tile 116 appears on the exemplary user interface 100. It is noted that the WMS button may be any type of actuator that, when actuated, initiates at least a portion of the framework described herein. Such an actuator has been labeled "WMS" herein merely for convenience and discussion purposes only.

The WMS tile 116 may include any practical number of actuators that provide miscellaneous work management processes to a user. In the present example, the WMS tile 116 includes a "New Action" actuator 118 and a "Record activity" actuator 120. The "Record Activity" actuator 120 can be actuated by the user if the user wants his work activities tracked for possible inclusion in a new or existing action. Once actuated, the "Record Activity" actuator 120 causes one or more system modules to track work activity performed by the user. Such tracking is described in greater detail below, with respect to subsequent figures.

When the described framework is initially installed on a system, a user has an option to automatically track work activity. If this option is selected or if it is provided as a default option, the user's work is automatically tracked from a time the user begins work and for a period that is either predefined or set by the user. For example, a system may be configured to track the immediately previous thirty minutes of work. If this is the case, then if the user decides to create a new action object from his work or add his work to a pre-existing action object, the work tracked in the thirty minutes immediately preceding an indication from the user to save the tracked work. Examples of the type of work saved includes but is not limited to intermediate states of documents the user edited, URLs (Universal Resource Locators) and historical content of web pages accessed, instant messaging (IM) conversations in which the user was engaged, etc. These saved items will be associated with an action object identified by the user.

Tracking a user's work activity and providing a user with the ability to create a new action object from tracked work resembles the practical manner in which many projects are initiated in the workplace. If a user is working on one or more tasks and subsequently decides that the work should be saved as an action object, the user selects the "New Action" actuator 118 to associate all open work items with a new action object.

Further aspects of the user interface 100 and its components are described in greater detail below, with respect to subsequent figures.

Exemplary User Interface—New Action Object Creation

Figure 2:
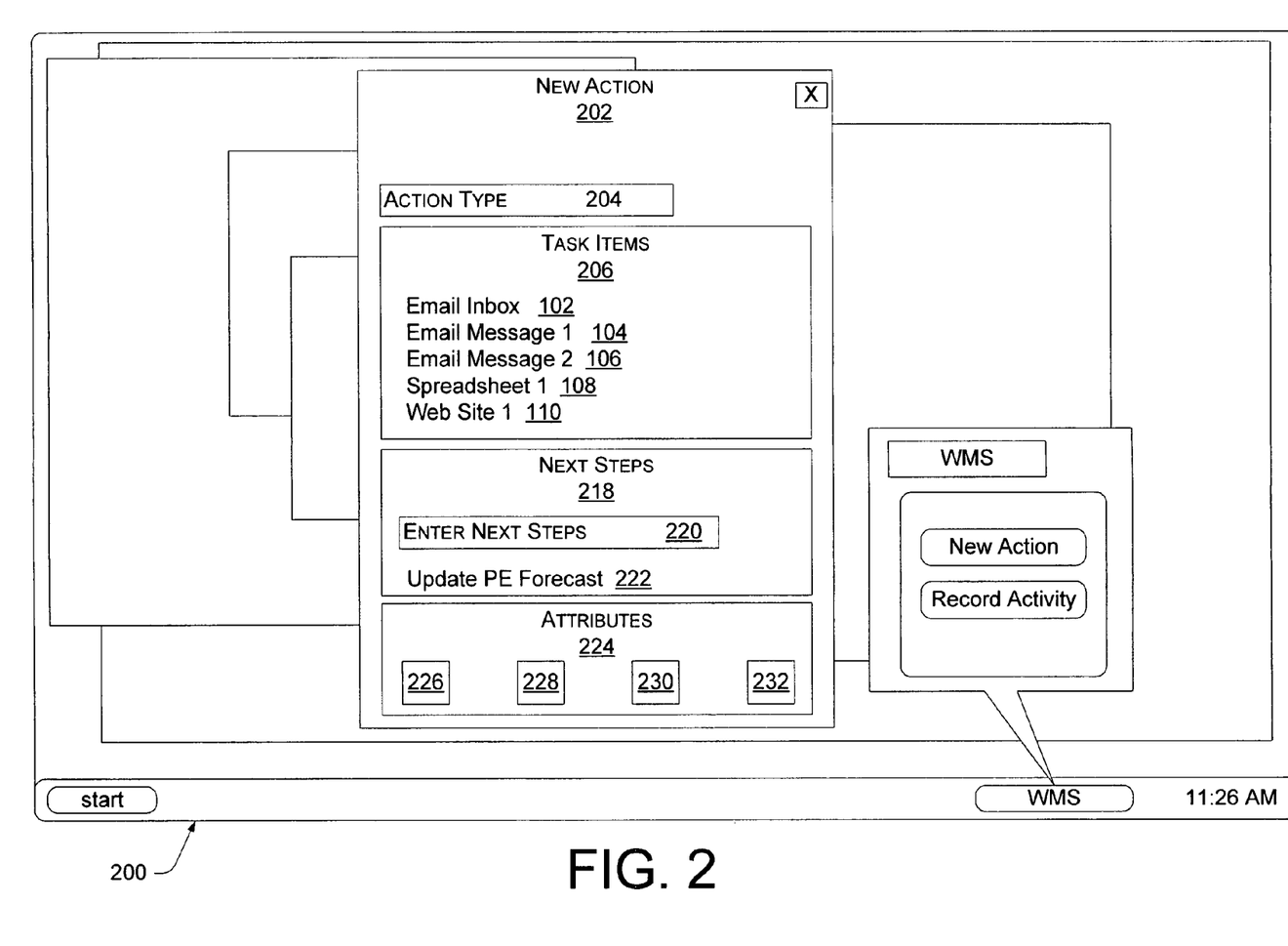
FIG. 2 is a simplified illustration of the user interface of FIG. 1 and further showing creation of a new action object.

FIG. 2 is a simplified illustration of an exemplary user interface 200 (similar to the user interface 100 shown in FIG. 1) showing creation of a new action object. In response to a user actuating the "New Action" actuator 118 (FIG. 1), a "New Action" tile 202 appears on the user interface 200. It is noted that the "New Action" tile 202 shown in FIG. 2 is exemplary only and that any components shown may be omitted from a particular implementation. Conversely, other implementations may include one or more other components that are not shown in FIG. 2.

The "New Action" tile 202 is shown having an "Action Type" field 204 in which a particular type of action may be entered. Action objects may have a type associated with them and the type can be used for sorting and searching processes. For example, an action object may have a type "Patent Application." Action objects of type "Patent Application" are related to patent applications and may include links to several document templates, contacts, images, etc. If an action object template exists for a particular action object type, then attributes and metadata associated with the action object template may be included with any action object created that has the same action type.

Although sorting and searching is described above in relation to an action type, it is noted that any other metadata can be used for sorting, searching, etc. For example, a user can search, sort and filter actions according to categories, people, dates, user defined metadata, and the like.

The "New Action" tile 202 also includes a task item field 206 that shows tasks items 208-216 that are currently associated with the new action object being created. The task items 208-216 shown in the present example (from FIG. 1) include: email inbox 102 (i.e. email application); email message 1 104; email message 2 106; spreadsheet 1 108; and web site 1 110. These are the task items that the user was working on (i.e. "current task items") when the user decided to save the task items in an action object. Any other tracked task items—i.e. task items worked on by the user during the tracking period but not open at the time user initiated creation of the new action object—would also be included in the task item field 206.

In one or more implementations, the task items 102-110 included in the task item field 206 are selectable so that the user may choose to include or omit a particular task item from the action object. For example, the user in the present example may wish to omit web site 1 110 from the new action object. Depending on the configuration and whether it presents the selectable task items 102-110 as already selected or not selected, the user will either de-select or select the web site 1 110 task item.

When a task item 102-110 is selected from the task items field 206, a link to the task associated with the task item is added to new action object. If current tasks are to be associated with a current action object, then the links to the task items are added to the existing action object. By including links to tasks instead of the tasks themselves, memory is conserved and the tasks can reside in their original space and be linked to by one or more other users.

The "New Action" tile 202 may also be configured to include one or more other features. In the present example, the "New Action" tile 202 includes a "Next Steps" tile 218 where a user may keep track of other tasks associated with the new action object that the user needs to begin, schedule, complete, etc. An "Enter Next Steps" field 220 is provided to allow the user to enter other tasks related to the new action object. In this particular example, a step identified as "Update PE Forecast" 222 is shown. This indicates that a user has entered this as a task to begin, schedule, complete, etc. as a part of the new action.

Another feature included in the "New Action" tile 202 as shown is an "Attributes" tile 224. The "Attributes" tile 224 may include information related to the new action object and/or represent links, information, etc. that the user may associate with the new action object. In the present example, the "Attributes" tile 224 includes multiple configurable attribute icons 226-232.

The attribute icons 226-232 can be configured to represent virtually anything—metadata, tools, processes, etc.—that a user may find helpful in creating a new action object. For example, attribute icon 226 may be an icon that represents a personal digital assistant (PDA) (not shown). By clicking on such an attribute icon 226, a user may associate the new action object with the user's PDA so that the action object and its links can be accessed from the PDA.

In other example, attribute icon 226 may be an icon that represents a mobile telephone (not shown). Clicking on the attribute icon 226 would associate data related to the user's mobile telephone with the action object. For example, a user may simply configure the attribute icon to include one or more telephone numbers with the action object when the attribute icon 226 is actuated.

Other examples of attributes that may be represented by an attribute icon include, but are not limited to:

Sharing—an attribute icon may be implemented to indicate that an action should be shared/accessible by a particular group of people;

Categorization/Goals—an attribute icon may be implemented to indicate that an action belongs to a particular category or is associated with a specified goal;

Required Procedures: an attribute icon may be implemented to indicate that a particular procedure must be performed in association with using an action, e.g. that the user must follow a "Sign Off" procedure before saving the action.

Other attribute icons 226-232 may be configured to carry out virtually any functions when actuated. It is noted that the above descriptions are exemplary only and are not exhaustive of the numerous possibilities that are configurable for the attribute icons 226-232.

Exemplary User Interface—Collateral Task Items

Figure 3:
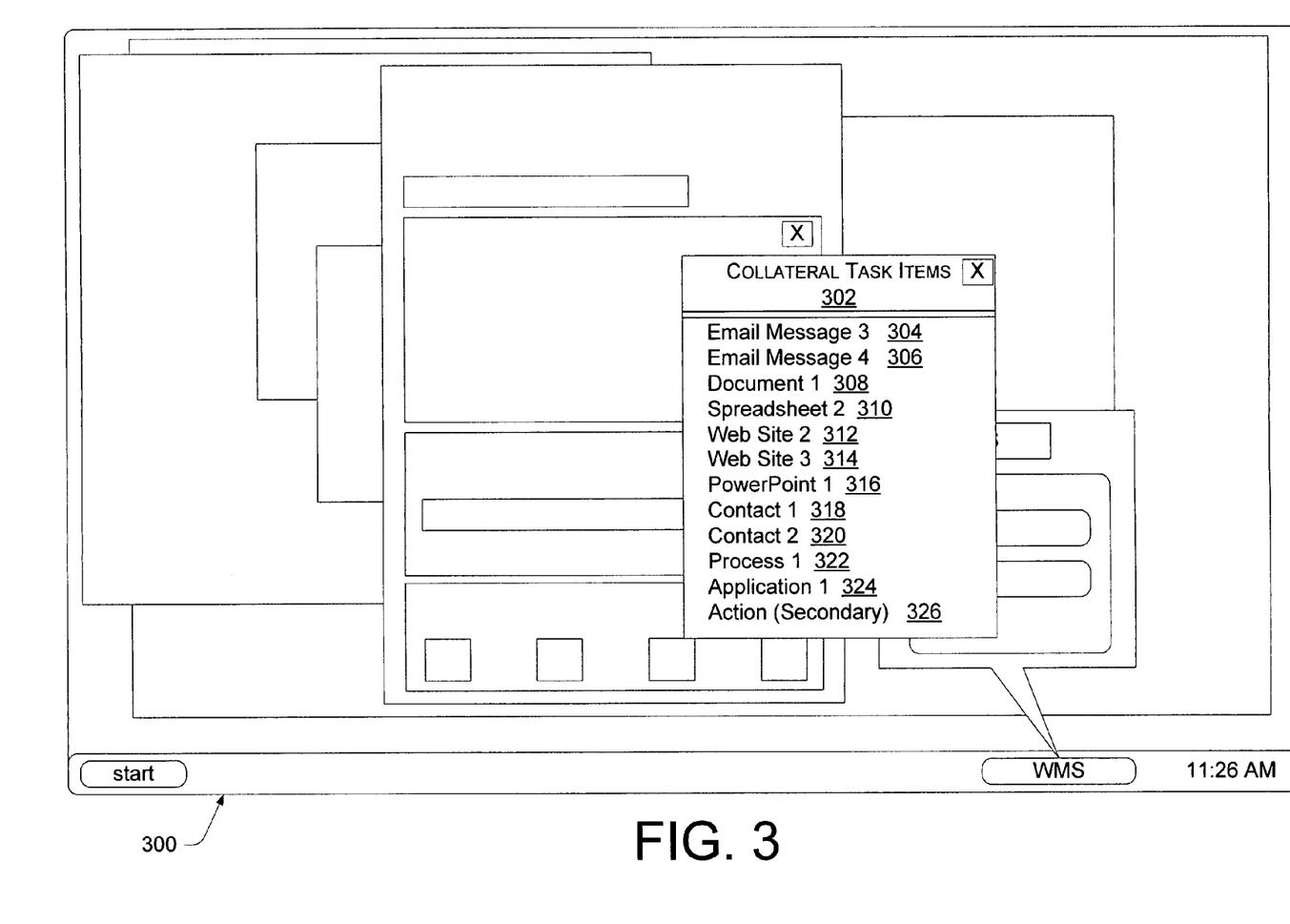
FIG. 3 is a simplified illustration of the user interface of FIG. 2 and further showing selectable collateral task items as described herein.

FIG. 3 is a simplified illustration a user interface 300 similar to the user interface 200 shown in FIG. 2 and further showing selectable collateral task items in a "Collateral Task Item" tile 302. The "Collateral Task Item" tile 302 appears after a user has finished associating task items with an action object via the "New Action" tile 202 (FIG. 2).

Task items that appear in the "New Action" tile 202 are items directly related to the new action object, i.e. tasks that the user is currently working on. Collateral task items that appear in the "Collateral Task Item" tile 302 are tasks that are related to task items that the user includes in the action object.

In order to assist a user in organizing tasks, collateral task items—such as contacts, files, documents, and the like—are presented to a user when the user creates an action object. A system can be configured to infer which collateral task items might be of interest to a user and to present these collateral task items to the user. The user may then select or ignore any or all of the presented collateral task items, depending on whether the user wants the collateral task items to be associated with the action object.

In the present example, the "Collateral Task Item" tile 302 includes "Email Message 3" 304, "Email Message 4" 306, "Document 1" 308, "Spreadsheet 2" 310, "Web Site 2" 312 and "Web Site 3" 314. This indicates that selection of any of these collateral task items will include the collateral task item as a task item in the new action object.

The "Collateral Task Item" tile 302 also includes "Power-Point 1" 316, "Contact 1" 318, "Contact 2" 320, "Process 1" 322, "Application 1" 324 and "Action (Secondary)" 326. "Action (Secondary)" is another action object that may be referenced as a task item by the new action object. Action objects may be nested in such a manner to any practical number of levels. In addition, an action can be included as a sub-action in multiple parent actions.

Although certain types of collateral task items have been identified (documents, spreadsheets, contacts, web sites, etc.), it is noted that task items and collateral task items may be linked to virtually any electronic file, including digital photographs, live camera feeds, and the like.

There are several ways in which a system may infer which task items may be appropriate to present as collateral task items. One way is to identify all task items associated with action objects having a same type as a current action object. For example, if the user is creating an action object having a type "Patent Application," collateral task items that could be identified for presentation to the user could be any task item associated with any other action object of type "Patent Application."

Another way to that collateral task items may be identified is to identify task items from other action objects that are similar to task items of the current action object. For example, if a task item from a current action object is an email message to "billg", then a system may be configured to present all email messages to "billg" from other actions. The user can then select any such email message that the user wishes to associate with the current action.

Any other intuitive method may be implemented to identify collateral task items that a user may wish to include as task items with a current action object.

Exemplary Action Object Store

Figure 4:
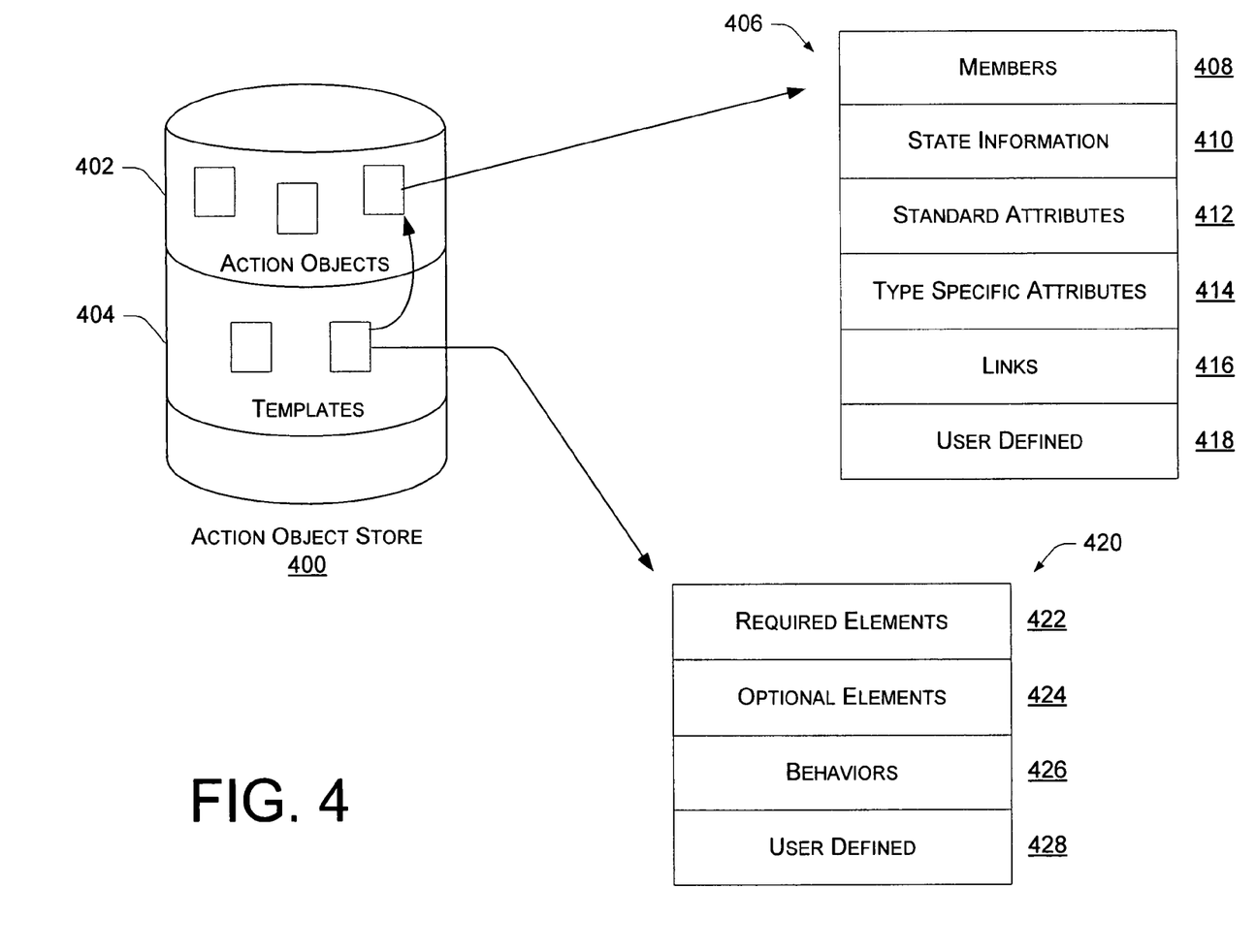
FIG. 4 is a diagram of an exemplary action object store in accordance with the present description.

FIG. 4 is a diagram of an exemplary action object store 400 in accordance with the present description. The exemplary action object store 400 stores one or more action objects 402 and up to several action object templates 404.

An exemplary action object 406 is shown in greater detail and includes members 408, state information 410, standard attributes 412, type specific attributes 414, links 416 and user defined elements 418. Members 408 may include any metadata that should be associated with an action object. Such metadata may include, but is not limited to, a globally unique identifier (guid), object creation information, modification information, predecessor information (i.e. is this action object a task item in another action object?), family information and/or the like.

State information 410 is used to preserve active states that are current when the action object is saved. For example, if the user saves an action object while the user has certain tiles open and viewable on a user interface, the user interface state is saved so that when the action object is accessed again, the same user interface view can be restored to the user. Other state information may include how long the user has worked on a particular action (total time and/or session time), what applications are being used, a web site history, etc.

Standard attributes 412 represents particular attributes that are standard, i.e. that are included with all action objects. Standard attributes 412 may include attributes such as where the action object is to be stored, what work categories are or might be related, etc. Some other examples of standard attributes include but are not limited to:

Due date;
Date started;
Date completed;
Auto-expire date (i.e. "discard after Jan. 1, 2005");
People (clients, participants, reviewers, team members, etc.);
Place(s) where action can be performed (e.g. home, store, etc.);
Goals; and
Keywords.

Type specific attributes 414 include attributes that are associated with a particular type of action object. Type specific attributes 414 may be in addition to the standard attributes 412 or may override similar standard attributes 412. For example, a standard attribute 412 may be an attribute that identifies a location to store the action object and this may generally apply to all action objects. However, when an action object is of a specific type (e.g. "Patent Application") a type specific attribute 414 may indicate a particular manner in which the action object can be stored (e.g., a "Patent Applications" directory), shared, handled, etc.

The links 416 area includes the necessary links to the task items, collateral task items, etc. that are associated with the action object 406 and that are presented to a user when the user is viewing the action in a user interface. For example, links to email messages, contacts, documents, another action object, etc. that are associated with the action object. By including links to task items instead of the task items themselves, memory is conserved and files are not duplicated. Instead, the files reside with their original application. This also causes the file to remain intact when being shared between users since users cannot alter different copies of the same file.

The user definitions 418 provides extensibility to the action object 406 schema. Users may use the user definitions allow individual users to add customized extensions to more specifically tailor an action object to meet a particular need. For example, if a user wants to be able to sort actions based on which actions can be performed at a home office, the user can add a "Do at home" attribute to the schema.

Action object templates 404 allow users to predefine certain types of action objects 402 that are suited to a function that is performed repeatedly in the course of the user's work. For example, if a user tends to deal with a lot of patent applications, the user may want to configure a "Patent Application" template that sets up some basic parameters of an action object that is used in conjunction with a patent application project.

An action object template 420 is shown in greater detail and includes a required elements section 422 and an optional elements section 424. The required elements section 422 is configurable as necessary to include elements that are included with each action object based on the action object template 420.

For example, if the action object template 406 is of a type "Patent Application," required elements may include a pointer to a patent application document template, a pointer to an information disclosure statement (IDS) form, a pointer to a directory containing transmittal forms, and/or the like. Any task item that is considered necessary to execute an action based on the action object type should be included in the required elements section 408.

On the other hand, the optional elements section 410 is configurable to include pointers to task items selected by a user, such as by one or more of the techniques previously described. Using the example of the "Patent Application" action object template, a user may pull in pointers to inventor contacts, technical documents, disclosure documents and/or the like to the optional elements section 410 of the action object template 406. Once this is done, the user may save the action object template 406 as an action object 402 thereby leaving the original action object template 406 intact.

In addition to these sections, the action object template 406 may be configured to include behaviors 412 and/or user definitions 414. Behaviors 412 include rules that are performed when dealing with the action object. For example, an action object of type "Patent Application" may include a behavior 412 that causes an updated copy of the action object to be sent to one or more contacts (either contacts associated with the action object or contacts specified in the particular behavior) whenever the action object is changed and saved.

The user definitions 414 provide an extensible property to the action object template 406. The user definitions 414 allow a user to configure the action object template 406 to particular needs. For example, a user can create a "Family Chores Item" action object template and include an extensible property to the template to indicate which family member is responsible for the identified chore, how much credit is earned for performing the chore, etc.

Exemplary Computing System

Figure 5:
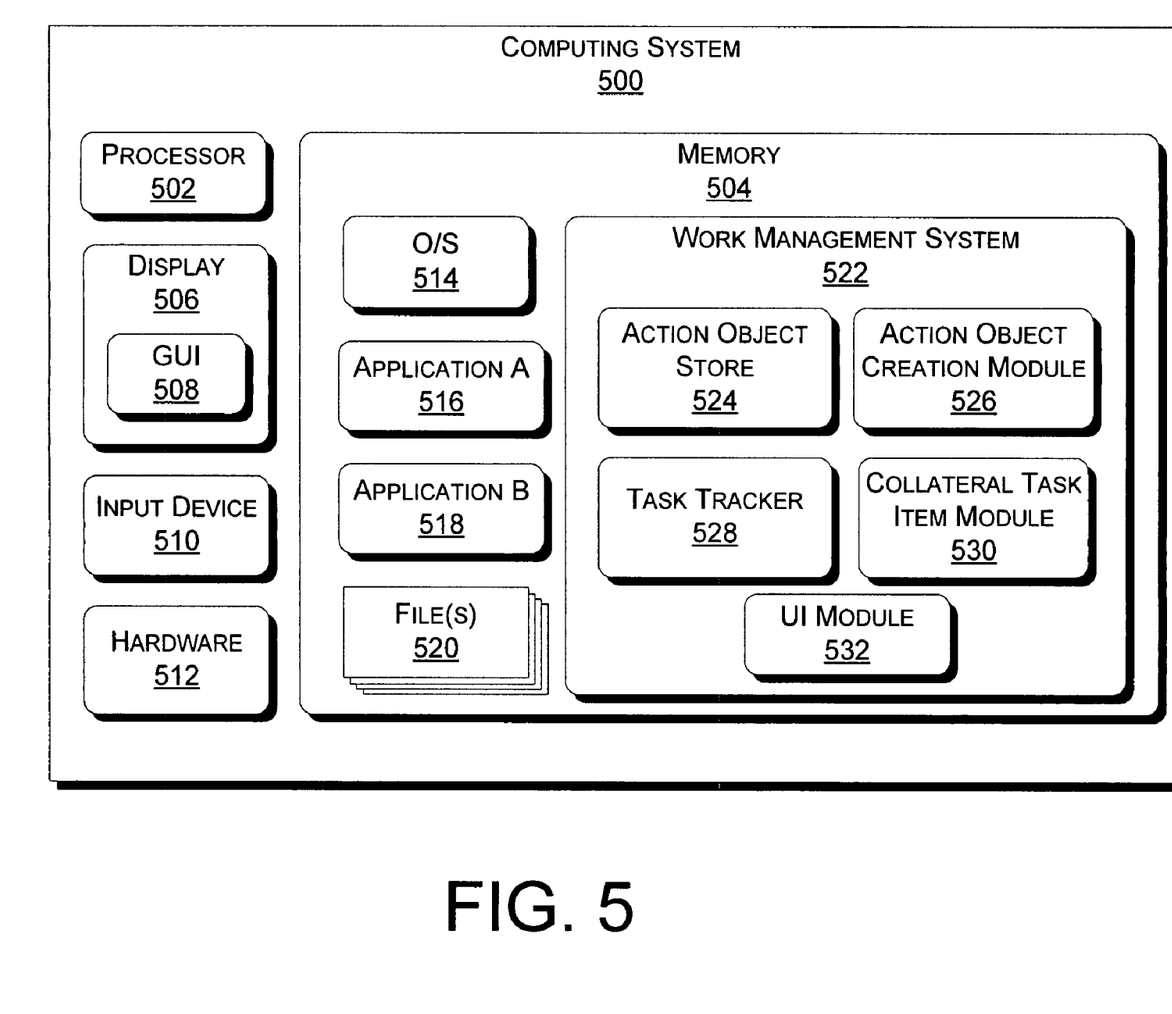
FIG. 5 is a block diagram of an exemplary computing system in accordance with the present description.

FIG. 5 is a block diagram of an exemplary computing system 500 in accordance with the present description. The exemplary computing system 500 includes various elements arranged in a particular manner and more or less particular functionality is attributed to the various elements below. However, it is noted that a computing system in accordance with the present description may have more or fewer and/or different elements, which may be distributed in a different arrangement than is shown herein. In addition, similar elements in one or more other implementations of a computing system in accordance with the present description may have functions similar but not identical to those described below, and said functions may be distributed differently among the different elements without departing from the scope of the subject matter claimed herein.

The exemplary computing system 500 includes a processor 502, memory 504 and a display 506 configured to display a graphical user interface 508 that is similar to the user interfaces described in relation to FIGS. 1-3. The exemplary computing system 500 also includes an input device 510, such as a mouse, stylus or the like, and other miscellaneous hardware 512 that may be found in typical computing systems and necessary to carry out the functionality described herein.

The memory 504 is shown storing an operating system 514 that controls the basic operations of the exemplary computing system 500 and miscellaneous other functions. The memory 504 is also shown with a first application ("Application A" 516), a second application ("Application B" 518), and one or more files 520 stored therein. Application A 516 and Application B 518 are processor-executable applications that may be used in accomplishing tasks as described herein. Such applications may include, but are not limited to word processing applications, spreadsheet applications, contact applications, email applications, electronic presentation applications, web browsers, etc.

The one or more files 520 are electronic files that are associated with various elements of the computing system 500, such as one or more email message files that are associated with Application A 516 (an email application in the immediate example). Although shown stored separately from the applications, the files may also be considered to reside within one or more application.

The memory 504 also includes an exemplary work management system 522 configured to carry out at least most of the functionality described herein. The exemplary work management system 522 includes an action object store 524 that can contain action objects (FIG. 4, 402) and/or action object templates (FIG. 4, 404). An action object creation module 526 is also included in the exemplary work management system 522 and is configured to create and/or modify action objects (not shown) in the action object store 524.

The exemplary work management system 522 includes a task tracker 528 that is configured to track tasks performed on the computing system 500. As previously described, tasks performed by a user can be tracked (by the task tracker 528) so that they can be included in an action object if and when the user decides that his work should be associated with an action object. The task tracker 528 is also configured to track states and processes currently in effect on the exemplary computing system 500.

A collateral task item module 530 is included in the exemplary work management system 522 and is configured to identify collateral task items associated with a current action object as described previously. As previously described, collateral task items may include task items from related action objects or task items that are similar to task items in a current action object. Other techniques to identify collateral task items may also be utilized.

The graphical user interface 508 is generated by a user interface (UI) module 532 that is included in the exemplary work management system 522. The UI module 532 includes computer-executable instructions that are executable on the processor 502 and that, when executed, cause the graphical user interface 508 to be displayed on the display 506. The UI module 532 may also be configured to identify and accept input from a user to one or more other modules of the exemplary computing system 500.

Further aspects of the functionality of the exemplary work management system 522 and its elements are described in greater detail below, with respect to FIG. 6.

Exemplary Methodological Implementation

Figure 6:
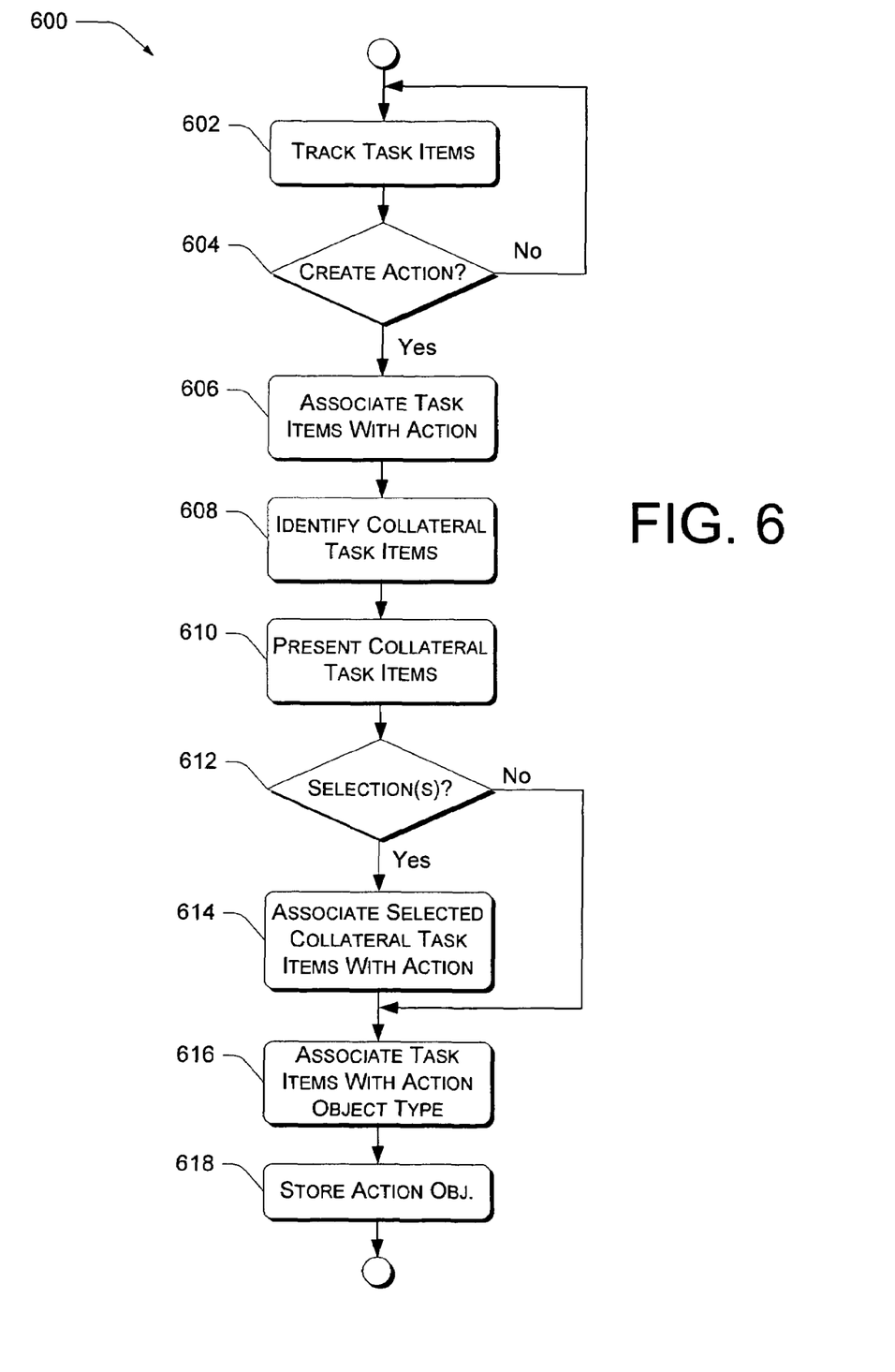
FIG. 6 is a flow diagram depicting an exemplary methodological implementation of a work management process utilizing action objects.

FIG. 6 is a flow diagram 600 depicting an exemplary methodological implementation of a work management process utilizing action objects. In the following discussion, continuing reference is made to elements and reference numerals shown in one or more previous figures. It is noted that the steps presented in the following exemplary methodological implementation may be performed alone or in conjunction with one or more other steps and that the steps may not necessarily be performed in the particular order shown below.

At block 602, the task tracker 524 tracks task items for user during a work session. This tracking entails tracking all or certain work activities across multiple applications as the user works. The task tracker 524 may be disabled if the user so desires or it may be configured to track task items for a certain time period. For example, the task tracker 524 may be configured to track the latest thirty minutes of a user's work or for all of a current working session. Different users will find it useful to configure the task tracking to occur at different times and/or for different intervals.

The task items are tracked until a user indicates that the user wishes to create a new action for the work with which the user is currently involved ("Yes" branch, block 604). In at least one implementation—as in the previous example discussed above—this can be done by the user actuating a user interface element indicating that the user wants to create a new action. As long as no indication is received to create a new action, the task items are continually tracked ("No" branch, block 604).

At block 606, the action creation module 526 creates an action object 402 for tracked worked. Tracked task items are associated with the action object 402 by establishing links in the action object 402 that reference the task items (files, documents, email messages, spreadsheets, websites, etc.) so that when the action object 402 is recalled, the task items that the user is working on at the time the action object is created are again presented to the user.

It is noted that a mechanism may be implemented for allowing a user to dissociate a tracked task item from the action object. For example (and as previously described) only task items that are selected by the user after the tracked task items are presented to the user may be associated with the action object. Other techniques may be employed that allow a user to dissociate task items from a stored action object.

At block 608, collateral task items are identified. Any of several ways of making this identification may be implemented. In one particular implementation, collateral task items are task items of secondary action objects (i.e. action objects other than a current action object) that have the same type as a primary action object (i.e. the current action object). For example, if the primary action object is of type "Patent Application" then collateral task items identified would include task items from other action objects of type "Patent Application."

In at least one other implementation, collateral task items are task items of secondary action objects that are similar to task items of the primary action object. For example, if a task item in the primary action object is an email to "jimb22" then other emails to "jimb22" may be presented to the user. If the user wants to include one or more of those other emails as a task item in the primary action object, the user simply selects the emails that the user wants to include.

In yet another implementation, collateral task items are task items of secondary action objects that are related in some manner to task items of the primary action object. For example, if a task item in the primary action object is a contact named "John Doe", the collateral task identifier may present a contact named "Jane Roe" to the user for possible inclusion in the primary action object because "Jane Roe" is a task item in a secondary action object that also includes "John Doe" as a task item (i.e. a contact). In other words, contacts that appear in secondary action objects with "John Doe" are identified as collateral task items.

At block 210, the collateral task items are presented to the user via the user interface 300. If the user chooses not to select any collateral task items so presented ("No" branch, block 212), then no collateral task items are associated with the primary action object. If the user makes selections from the presented collateral task items ("Yes" branch, block 212), then the selected collateral task items are associated with the action object at block 214.

At block 216, a type is associated with the action object. This step may occur at this or any other point in the described process, such as when a user initially creates the action object. Although an action object does not necessarily have to have a type associated with it, there are advantages to such a configuration, including facility of searching, sorting, grouping, etc.

At block 218, the action object is stored in the action object store 400 where it can be recalled and/or modified as needed.

Exemplary Operating Environment

Figure 7:
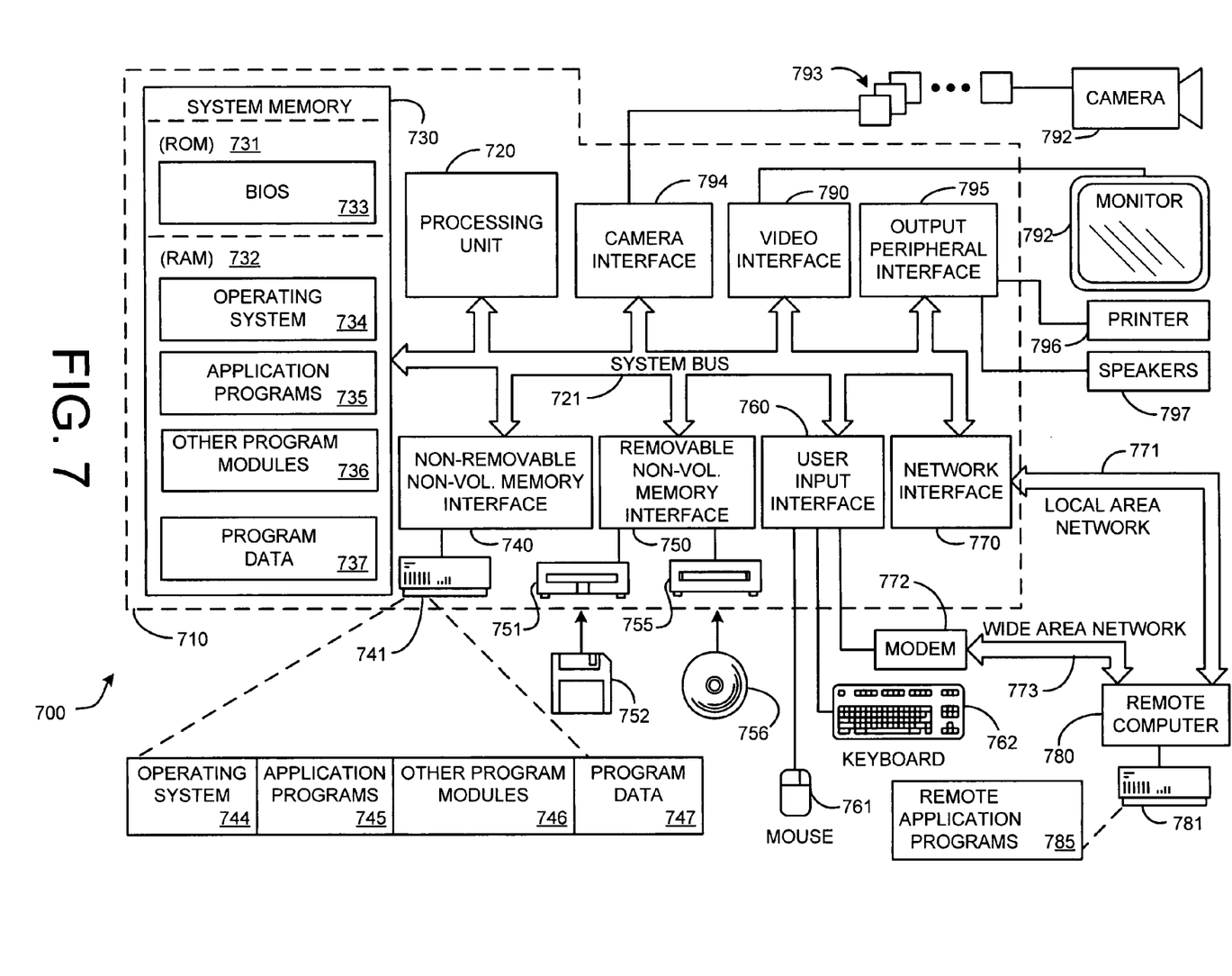
FIG. 7 is a block diagram depicting an exemplary general purpose computing device that may be used in conjunction with one or more implementations described herein.

FIG. 7 is a block diagram depicting a general purpose computing environment 700 that may be used in one or more implementations according to the present description. The computing system environment 700 is only one example of a suitable computing environment and is not intended to suggest any limitation as to the scope of use or functionality of the claimed subject matter. Neither should the computing environment 700 be interpreted as having any dependency or requirement relating to any one or combination of components illustrated in the exemplary operating environment 700.

The described techniques and objects are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The following description may be couched in the general context of computer-executable instructions, such as program modules, being executed by a computer. Generally, program modules include routines, programs, objects, components, data structures, etc. that perform particular tasks or implement particular abstract data types. The described implementations may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through anon-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus 721, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795. Of particular significance to the present invention, a camera 763 (such as a digital/electronic still or video camera, or film/photographic scanner) capable of capturing a sequence of images 764 can also be included as an input device to the personal computer 710. Further, while just one camera is depicted, multiple cameras could be included as an input device to the personal computer 710. The images 764 from the one or more cameras are input into the computer 710 via an appropriate camera interface 765. This interface 765 is connected to the system bus 721, thereby allowing the images to be routed to and stored in the RAM 732, or one of the other data storage devices associated with the computer 710. However, it is noted that image data can be input into the computer 710 from any of the aforementioned computer-readable media as well, without requiring the use of the camera 763.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

CONCLUSION

While one or more exemplary implementations have been illustrated and described, it will be appreciated that various changes can be made therein without departing from the spirit and scope of the claims appended hereto.

The invention claimed is:

1. A method, comprising:
   generating a primary action object
   automatically tracking one or more user selected task items within an electronic workspace;
   associating the tracked task items with the primary action object;
   automatically locating one or more secondary action objects, and identifying one or more collateral task items within the one or more secondary action objects, wherein the indentified collateral task items are associated with both similar and disparate applications;
   presenting the one or more identified collateral task items via a user interface;
   selecting at least one of the presented collateral task items;
   associating the selected collateral task items with the primary action object; and
   storing the primary action object.

2. The method as recited in claim 1, further comprising receiving a request to associate the task items with the primary action object.

3. The method as recited in claim 2, wherein the request to associate the task items with the primary action object occurs after at least one task item has been tracked.

4. The method as recited in claim 1, wherein the one or more task items further comprise task items selected from the following list of task items: e-mail messages; word processing documents; contacts; electronic spreadsheets; electronic presentation slides; processes; application programs; user interface state; web sites; action objects.

5. The method as recited in claim 1, wherein the identifying step further comprises identifying collateral task items from one or more secondary action objects that are similar to the primary action object.

6. The method as recited in claim 5, further comprising identifying an action object type associated with the primary action object and with the secondary action objects; and wherein a secondary action object is similar to the primary action object if the secondary action object is the same type as the primary action object.

7. The method as recited in claim 1, wherein the identifying step further comprises identifying collateral work items from a secondary action object that are similar to the tracked task items.

8. The method as recited in claim 1, wherein the tracked task items are represented in the primary action object as links.

9. The method as recited in claim 1, further comprising:
    identifying an action type associated with the primary action object;
    associating the tracked task items and the selected collateral task items with the action type.

10. A work management system stored on one or more computer-readable storage media, having computer executable instructions that when executed cause a computer to generate:
    a task tracker configured to automatically track one or more user selected task items processed during a work session;
    an action object creation module configured to create a current action object and to associate at least one or the one or more task items with the current action object;
    a collateral task item module configured to automatically identify collateral task items, associated with similar and disparate applications, from one or more stored action objects and to associate collateral task items with the current action object upon selection by a user; and
    an action object store to store the current action object and the stored action objects.

11. The work management system as recited in claim 10, wherein the task items are tracked across multiple applications.

12. The work management system as recited in claim 10, wherein the task items are represented as links in the current action object.

13. The work management system as recited in claim 10, wherein the collateral task item module is further configured to identify collateral task items as being task items from stored action objects of a same type as the current action object.

14. The work management system as recited in claim 10, wherein the collateral task item module is further configured to identify collateral task items as being task items from stored action objects that are similar to task items from the current action object.

15. The work management system as recited in claim 10, wherein the collateral task item module is further configured to identify collateral task items as being task items from stored action objects that are related to similar task items from the current action object.

* * * * *